(12) United States Patent
Tu et al.

(10) Patent No.: US 9,460,419 B2
(45) Date of Patent: Oct. 4, 2016

(54) STRUCTURING UNSTRUCTURED WEB DATA USING CROWDSOURCING

(75) Inventors: Yi-Chin Tu, Sammamish, WA (US); Aleksey Sinyagin, Bothell, WA (US); Xiaoxin Yin, Bothell, WA (US); Wenzhao Tan, Redmond, WA (US); Li-wei He, Redmond, WA (US); Yi-Min Wang, Bellevue, WA (US); Emre Kiciman, Seattle, WA (US); Chun-Kai Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 12/971,976

(22) Filed: Dec. 17, 2010

(65) Prior Publication Data
US 2012/0158668 A1 Jun. 21, 2012

(51) Int. Cl.
G06F 17/30 (2006.01)
G06Q 10/10 (2012.01)
(52) U.S. Cl.
CPC ....... G06Q 10/101 (2013.01); G06F 17/30882 (2013.01)
(58) Field of Classification Search
CPC ............ G06F 17/30861; G06F 17/30885; G06F 17/3089
USPC ........................................................ 707/811
See application file for complete search history.

(56) References Cited

U.S. PATENT DOCUMENTS

| | | | |
|---|---|---|---|
| 7,512,601 B2 | 3/2009 | Cucerzan et al. | |
| 7,657,519 B2 | 2/2010 | Anderson et al. | |
| 2005/0222973 A1 | 10/2005 | Kaiser | |
| 2007/0027911 A1* | 2/2007 | Hakala et al. | 707/104.1 |
| 2009/0217196 A1* | 8/2009 | Neff et al. | 715/799 |
| 2009/0307085 A1 | 12/2009 | Lejano et al. | |
| 2010/0161592 A1 | 6/2010 | Zhao | |
| 2010/0169148 A1* | 7/2010 | Oberhofer et al. | 705/9 |
| 2010/0254608 A1* | 10/2010 | Flesselles | 382/182 |
| 2011/0032109 A1* | 2/2011 | Fox | G08B 25/006 340/628 |
| 2011/0055613 A1* | 3/2011 | Mandyam | H04W 52/0258 713/340 |
| 2011/0202557 A1* | 8/2011 | Atsmon et al. | 707/769 |

(Continued)

OTHER PUBLICATIONS

Liu, Huan, and Dan Orban. "Gridbatch: Cloud computing for large-scale data-intensive batch applications." Cluster Computing and the Grid, 2008. CCGRID'08. 8th IEEE International Symposium on. IEEE, 2008.*

(Continued)

Primary Examiner — Nan Hutton
(74) Attorney, Agent, or Firm — Alin Corie; Sandy Swain; Micky Minhas

(57) ABSTRACT

A crowdsourcing data structuring system and method for capturing unstructured data from the Web and adding structure by placing the data in a document that is accessible by others in a cloud computing environment. Using crowdsourcing, the unstructured data is annotated, amended, and verified to add structure to the unstructured data. An anchor and update module convert the data to a pointer that links the document to the data at an information source and stores the pointer in the document rather than the data itself. The data displayed in the document is updated whenever the information source is updated. A contribution module allows users to add data to the document, a validation module allows users to determine the validity of the data linked to in the document, and an expert ranking module allows users to rank the expert or contributor of the data in the document.

20 Claims, 8 Drawing Sheets

(56) References Cited

U.S. PATENT DOCUMENTS

2012/0096389 A1* 4/2012 Flam et al. .................. 715/777
2013/0205195 A1* 8/2013 Dekhil .................. G06Q 10/10
715/234

OTHER PUBLICATIONS

Gruber, Tom. "Collective knowledge systems: Where the social web meets the semantic web." Web semantics: science, services and agents on the World Wide Web 6.1 (2008): 4-13.*
Irwin, David, et al. "Resource management in data-intensive clouds: opportunities and challenges." Local and Metropolitan Area Networks (LANMAN), 2010 17th IEEE Workshop on. IEEE, 2010.*
Hoffman, Harrison., "Google adds anchor links to search results", Retrieved at << http://news.cnet.com/8301-13515_3-10362163-26.html >>, Sep. 25, 2009, pp. 2.
Guo, et al., "Exploring client-side instrumentation for personalized search intent inference: preliminary experiments", Retrieved at >> http://www.mathcs.emory.edu/~qguo3/Guo.pdf >>, In Proceedings of the AAAI Workshop on Intelligent Techniques for Web Personalization and Recommender Systems (ITWP), 2008, pp. 10.
Radhakrishnan, Arun., "SenseBot : summarizing search engine results", Retrieved at << http://www.searchenginejournal.com/sensebot-summarizing-search-engine-results/5294/ >>, Jul. 10, 2007, pp. 6.
"HEED user guide.", Retrieved at << http://onlinelibrary.wiley.com/store/10.1002/9780470510933/asset/homepages/User_Guide.pdf;jsessionid=6B76EEB9DF34674E83C4AE689350880E.d03t01?v=1&s=9ad291726054c954cf70668b13bf49deeb55df84&isDatabase=true , pp. 22.

* cited by examiner

STRUCTURING UNSTRUCTURED WEB DATA USING CROWDSOURCING

BACKGROUND

The World Wide Web (or "Web") is a vast source of information. However, much of this information is duplicated or overlapping. This is because numerous people may have investigated a problem, issue or subject, and create contents for this problem, issue or subject on the web. In order to compile information about the problem, issue, or subject, a user searches websites and blogs to compile the information.

It is desirable to be able to capture data from the Web during a search and then place it in a document containing the information obtained about the problem, issue, or subject. Typically, this document is stored locally on a user's machine. One problem with this is that the information is usually only available to a select few. Usually no one else benefits from the research and the efforts taken to compile the information is wasted.

Another problem with locally storing information captured from the Web in a document produced by word processing software is that the information stored therein is not updated whenever information on the website is updated. In other words, whenever the website changes the information that the user obtained from the website and placed in word processing document will not change. Data copied from a website and stored in a word processing document is a snapshot in time of the information at the time when it was capture. However, if the data on the website changes the captured data can quickly become stale.

One reason that the data is not updated is because much of the information on the Web is unstructured data, which means that the data is not in a database or in a database format. For example, an online encyclopedia website just contains text and images. The data in these types of websites is updated regularly because structured data is used. However, websites rely on structured data are limited on the information they can get from the Web.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the crowdsourcing data structuring system and method obtain unstructured data from the Web, add structure by placing the data in a document, and store the document in a cloud computing environment such that the document is accessible by others. Using crowdsourcing the unstructured data is annotated, amended, and verified to add structure to the unstructured data.

Crowdsourcing is a term for having a large pool of users create something rather than a single person or small group of persons. In embodiments of the crowdsourcing data structuring system and method, crowdsourcing is used to produce a document that allows users to summarize information and place information in a larger context so that others can view. Embodiments of the system and method allow others to benefit from a creator's work and the information that the creator has found. The documents created by embodiments of the system and method can be shared with others, validated by others, and enriched and improved by others. This means that the information contained in that document becomes more comprehensive and accurate over time.

Embodiments of the crowdsourcing data structuring system and method allow an author of a document to define an area of interest in a website (or some other information source) on the Web. In some embodiments the author highlights the area of the website in which he is interested. In some embodiments the author obtains information from a variety of websites, search results, or both. The document is created by the author to summarize the information obtained from the Web regarding the problem, issue, or subject.

Rather than cutting and pasting the data into a document, embodiments of the system and method convert the data into a link or pointer to the data. This pointer to the data is a link to that portion or location of the website containing the data. The pointer then is stored in the document.

The document then is stored in a cloud computing environment that is accessible to other users. The document is not stored locally. Storing the document in the cloud computing environment allows other users to use and contribute to the information contained in the document. Moreover, the level of access can be determined by the author of the document. For example, the author can allow the document to be altered by anyone or only a select few. One advantage of granting users access to the document is that crowdsourcing can be used to structure the data from the Web by having these users contribute and annotate the data. This means that the more users interact with and contribute to the document, the document will become more accurate and useful.

Embodiments of the crowdsourcing data structuring system and method include an anchor and update module. This module ensures that information displayed in the document is automatically updated when the website from which the data comes is updated. In particular, when a user access the document the pointer links the document to the data at the website and displays that data to the user. If the data was updated since the last time the document was accessed then the updated data is displayed in the document. In other words, the document is updated whenever the information source is updated. This ensures that the user is always viewing updated data.

Embodiments of the crowdsourcing data structuring system and method also include a contribution module that allows users to add information and data to the document. This is achieved by adding additional pointers to data in websites or other information sources on the Web. This appended document is then saved and stored in the cloud computing environment to give other users the opportunity to contribute to the document.

Embodiments of the crowdsourcing data structuring system and method also include a validation module and an expert ranking module. The validation module allows a user to examine the data linked to in the document and determine whether the data is valid. If any portion of the data is invalid, the user is given the opportunity to correct the invalid data. The expert ranking module allows a user to rank the expert or contributor of the data in the document. These expert rankings are displayed along with the data being displayed when the document is accessed. Data validation and expert ranking using crowdsourcing improve the accuracy and veracity of the data in the document.

Embodiments of the crowdsourcing data structuring system and method also can automatically suggest a name for the document based on the data contained therein. In alternative embodiments, the user can override the automatic name suggestion and name the document himself. Moreover, the multiple pointers in a document facilitate an interactive query session for defining tasks. For example, if a document author is going to purchase an automobile and is evaluating different car dealers, multiple pointers can be used to mark multiple data locations to complete this task.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a crowdsourcing data structuring system and method reference is made to the accompanying drawings, which form a part thereof, and in which is shown by way of illustration a specific example whereby embodiments of the crowdsourcing data structuring system and method may be practiced. It is to be understood that other embodiments may be utilized and structural changes may be made without departing from the scope of the claimed subject matter.

I. System Overview

Figure 1:
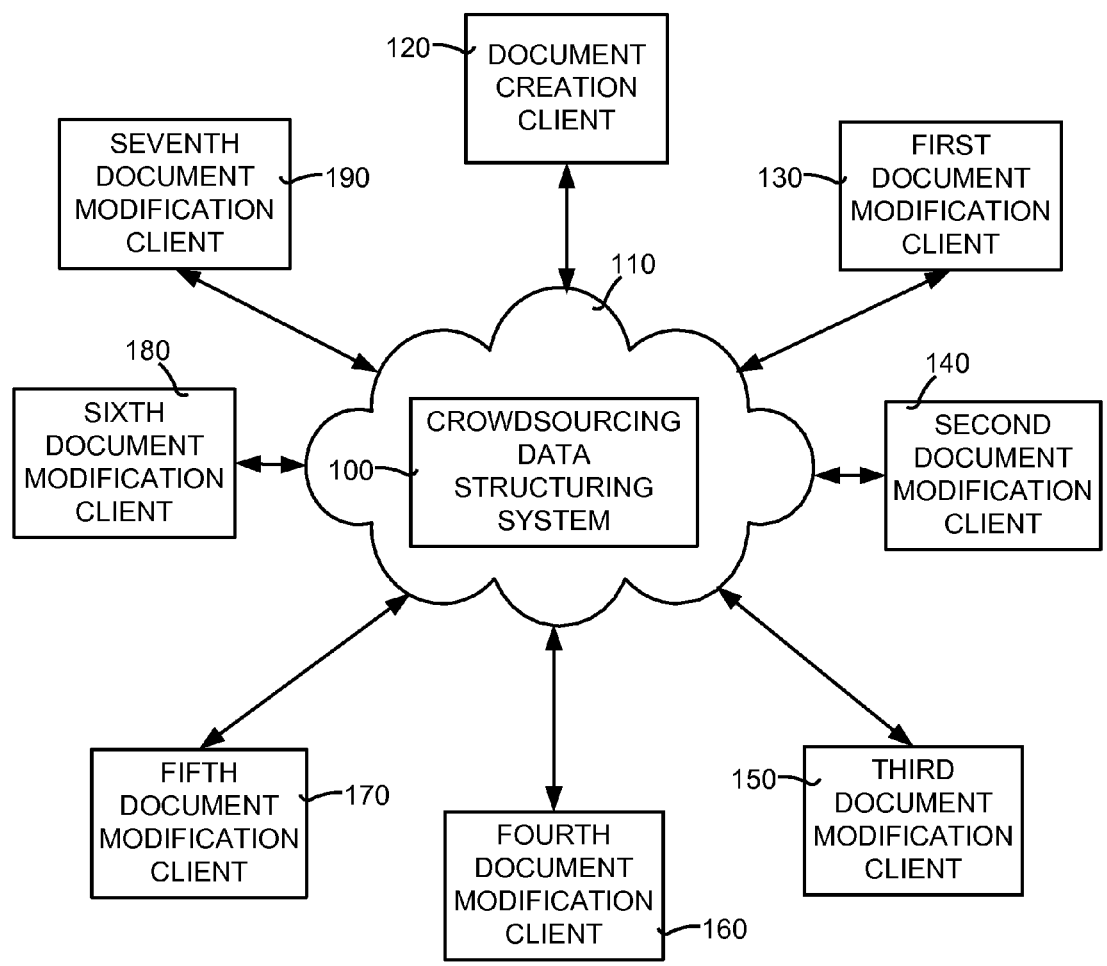
FIG. 1 is a block diagram illustrating a general overview of embodiments of the crowdsourcing data structuring system and method implemented in a cloud computing environment.

FIG. 1 is a block diagram illustrating a general overview of embodiments of the crowdsourcing data structuring system 100 and method implemented in a cloud computing environment 110. Note that FIG. 1 is merely one way in which embodiments crowdsourcing data structuring system 100 and method may be implemented, and is shown merely for illustrative purposes. It should be noted that there are several other ways in which embodiments of the crowdsourcing data structuring system 100 and method may be implemented, which will be apparent to those having ordinary skill in the art.

In general, embodiments of the crowdsourcing data structuring system 100 and method obtain unstructured data from the Web and add structure to the unstructured data. In addition, embodiments of the crowdsourcing data structuring system 100 and method use crowdsourcing to refine, augment, and validate the data. Embodiments of the crowdsourcing data structuring system 100 and method also keep the data updated.

As shown in FIG. 1, embodiments of the crowdsourcing data structuring system 100 and method are disposed in the cloud computing environment 110. In general, cloud computing is Internet-based computing where shared resources are provide on demand to computing devices in communication with the cloud. In FIG. 1 a plurality of client computing devices are in communication with the cloud computing environment 110. These client computing devices are shown in FIG. 1 as boxes with arrows attached to the cloud computing environment 110. Although eight client computing devices are shown in FIG. 1, it will be appreciated that a greater or a fewer number of client computing devices may be in communication with the cloud computing environment 110 at any given time.

One of the client computing devices is a document creation client 120. This document creation client 120 creates a document (not shown) containing information that a user has placed in the document. The remainder of the client computing devices shown in FIG. 1 are document modification clients. These document modification clients add to the document either by adding information, validating the information, or ranking the expert that provided any part of the information in the document.

In particular, these document modification clients include a first document modification client 130, a second document modification client 140, a third document modification client 150, a fourth document modification client 160, a fifth document modification client 170, a sixth document modification client 180, and an eighth document modification client 190. It should be noted that the document creation client 120 can also be used at a document modification client. In addition, any one of the client computing devices can be used to create another document and thus can be a document creation client.

Figure 2:
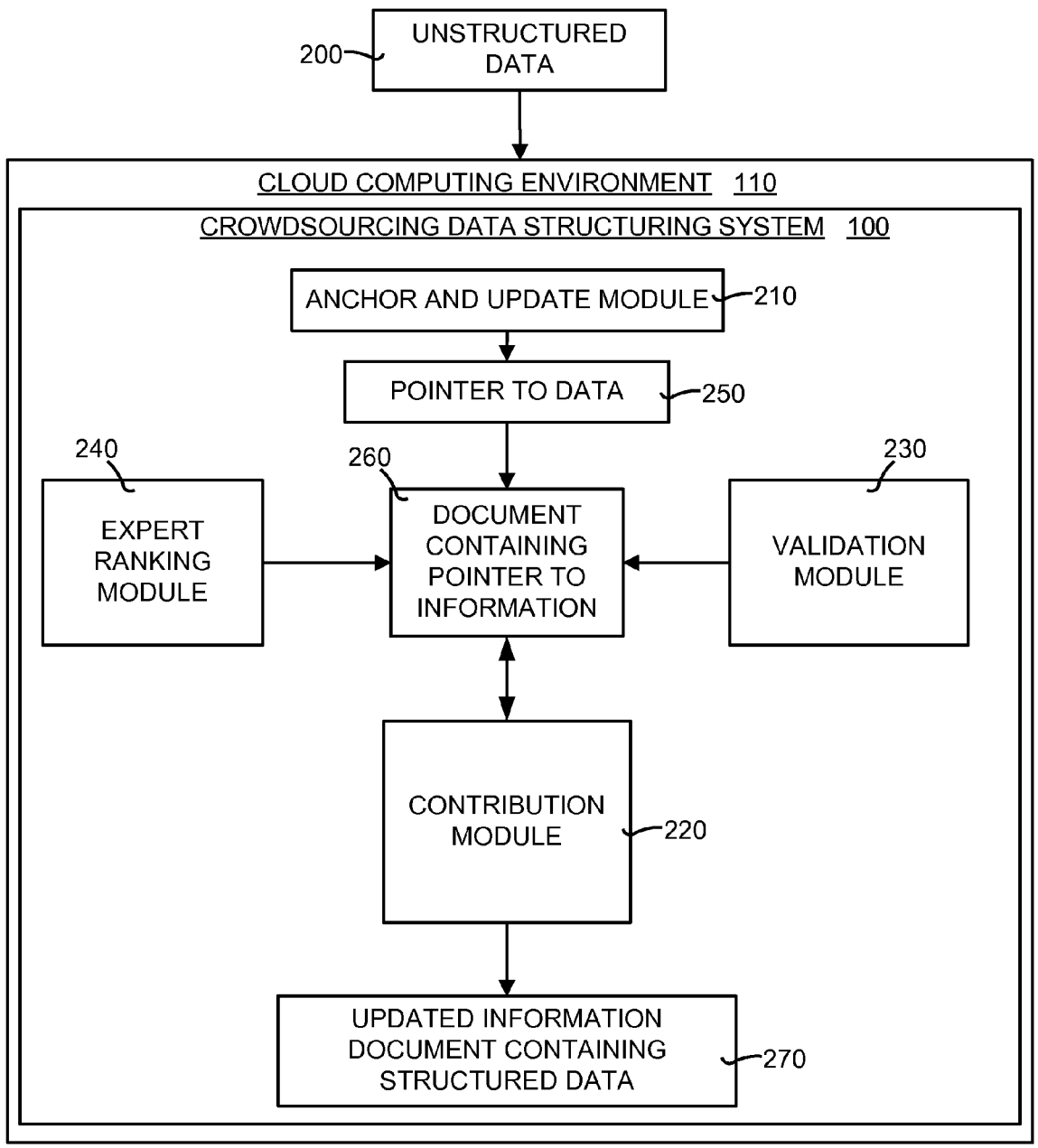
FIG. 2 is a block diagram illustrating details of embodiments of the crowdsourcing data structuring system shown in FIG. 1.

FIG. 2 is a block diagram illustrating details of embodiments of the crowdsourcing data structuring system 100 shown in FIG. 1. Unstructured data 200 from the Web is obtained by the document creation client and input to embodiments of the crowdsourcing data structuring system 100, which is in the cloud computing environment 110. The embodiments of the crowdsourcing data structuring system 100 include an anchor and update module 210, a contribution module 220, a validation module 230, and an expert ranking module 240.

The anchor and update module 210 provides anchors in the document that is created so that the information contained in the unstructured data 200 is updated in the document whenever the location on the Web from where the information came is updated. In particular, the anchor and update module 210 provide a pointer to the data 250 and place this pointer in the document. This pointer to the data 250 points to the location on the Web where the unstructured data 200 can be found.

The resultant document is a document containing a pointer to the information 260. This information comes from the unstructured data 200 obtained from the Web. The contribution module 220 allows the creator of the document and others to augment the information in the document containing a pointer to the information 260. The validation module 230 allows others to validate the information in the document containing a pointer to the information 260. Moreover, the expert ranking module 240 allows other to rank the expert or experts that generated any of the data and information contained in the document containing a pointer to the information 260. This facilitates the evolution of a document that becomes more accurate and comprehensive over time.

II. Operational Overview

Figure 3:
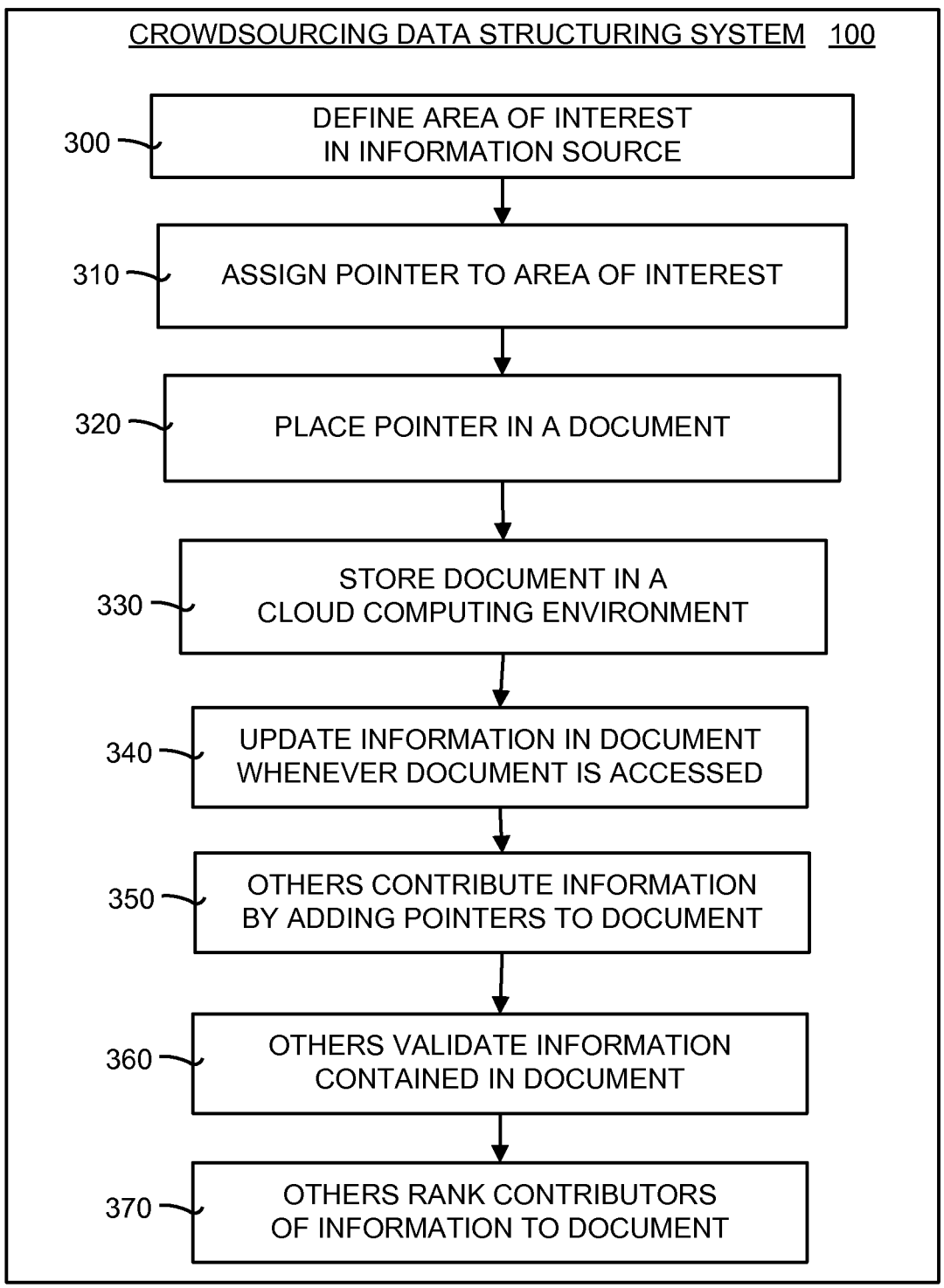
FIG. 3 is a flow diagram illustrating the general operation of embodiments of the crowdsourcing data structuring system and method shown in FIGS. 1 and 2.

FIG. 3 is a flow diagram illustrating the general operation of embodiments of the crowdsourcing data structuring system 100 and method shown in FIGS. 1 and 2. In general, embodiments of the crowdsourcing data structuring system 100 and method obtain unstructured data from the Web and add structure by placing the data in a document that is accessible by others in a cloud computing environment. Referring to FIG. 3, the method begins by having a user define an area of interest in an information source (box 300). Typically, this information source is a website on the Web.

Next, embodiments of the crowdsourcing data structuring system 100 and method assign a pointer to the area of interest (box 310). This pointer then is place in a document (box 320). The pointer is used to locate the information at the information source whenever the document is accessed. This document then is stored in a cloud computing environment 110 (box 330). In the cloud computing environment, the document can be accessible to a plurality of people for viewing, reviewing, and modification.

The information in the stored document is updated whenever the document is updated (box 340). The pointers to the information are used to aid in the updating of the information. The stored document can be added to by having others contribute information (box 350). The adding of information is performed by adding additional pointers to the document. As before, the pointers are used to locate the added information at the information source whenever the document is accessed.

In addition, embodiments of the crowdsourcing data structuring system 100 and method facilitate others validating information contained in the document (box 360). In other words, others can view the document and comment on the validity of the information contained therein. Moreover, others can rank the experts or contributors of information to the document (box 370). This gives viewers of the document some idea of how accurate and useful is the information given by any expert.

III. Operational Details

The operational details of embodiments of the crowdsourcing data structuring system 100 and method now will be discussed. These embodiments include embodiments of the anchor and update module 210, the contribution module 220, the validation module 230, and the expert ranking module 240. The operational details of each of these modules now will be discussed in detail.

III.A. Anchor and Update Module

Figure 4:
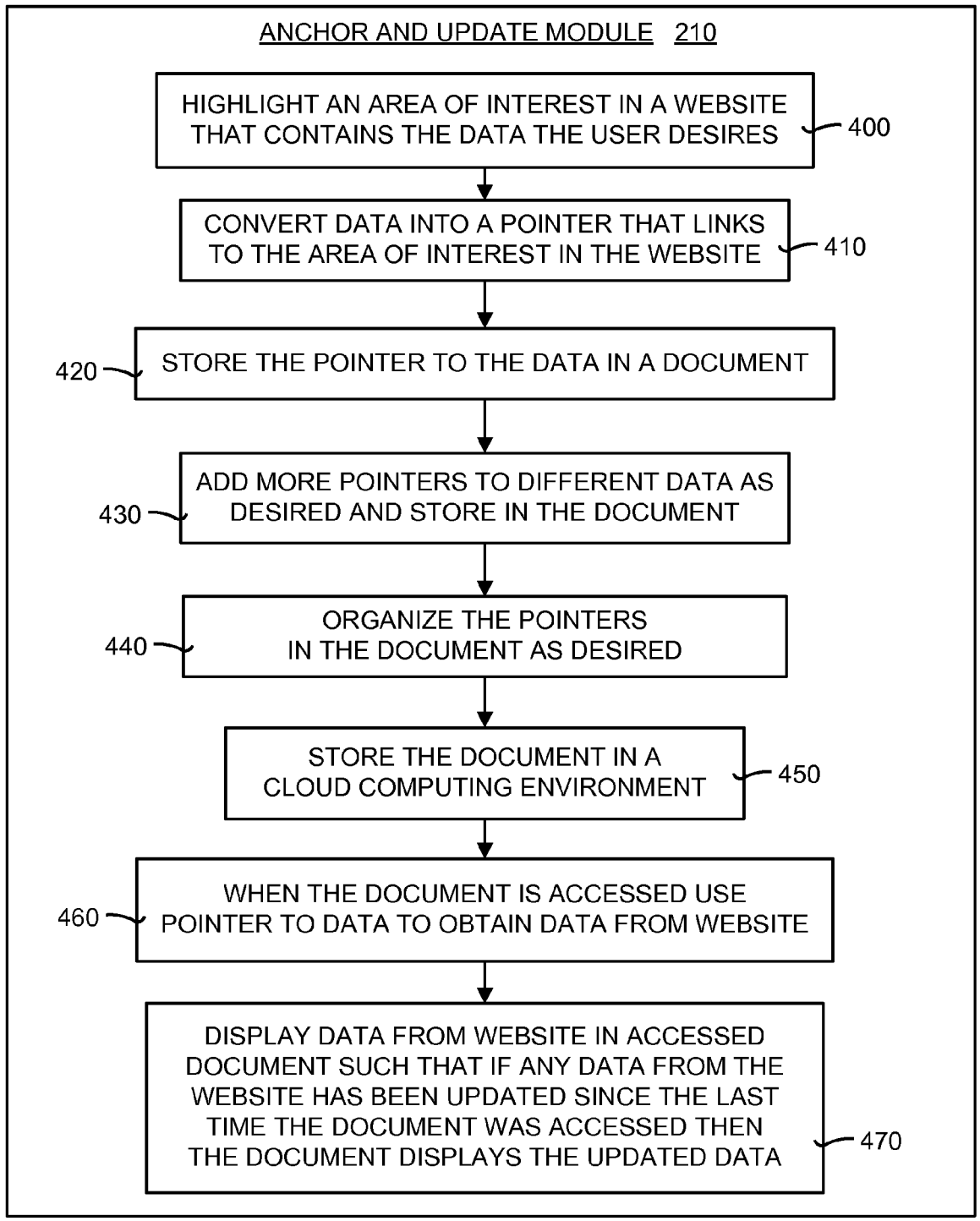
FIG. 4 is a flow diagram illustrating the operational details of embodiments of the anchor and update module shown in FIG. 2.

The anchor and update module 210 anchors data in the document to a particular information source (such as a website) and updates the data in the document as the data at the information source is updated. FIG. 4 is a flow diagram illustrating the operational details of embodiments of the anchor and update module 210 shown in FIG. 2. The operation of embodiments of the anchor and update module 210 begins with the user highlighting an area of interest in a website (or other information source) that contains the data that the user desires to capture (box 400).

This data is converted into a pointer that links to the area of interest in the website (or other information source) (box 410). The pointer to the data is stored in a document (box 420). In other words, the instead of storing the actual unstructured data captured by the user from the Web, only the pointer to the data is stored in the document. Moreover, more pointers can be added to the document as desired (box 430). This occurs as the user finds more data in other websites or at the same website that the user wants to include in the document.

The user then can organize the pointers to the data in the document as desired (box 440). In other words, the user can arrange the data in the document as desired and as he would like it displayed when the document is accessed. Once the user is finishes creating the document, it is stored in the cloud computing environment 110 (box 450).

When the time comes and the document is accessed by another user, the pointer to the data is used to obtain data from the website (or other information source) (box 460). The data from the website (or other information source) is displayed in the accessed document. The data is displayed such that if any data from the website (or other information source) has been updated since the last time the document was accessed, then the document displays the updated data (box 470). In this manner, the anchor and update module 210 uses the pointers to ensure that the data displayed in the accessed document is current data.

III.B. Contribution Module

Figure 5:
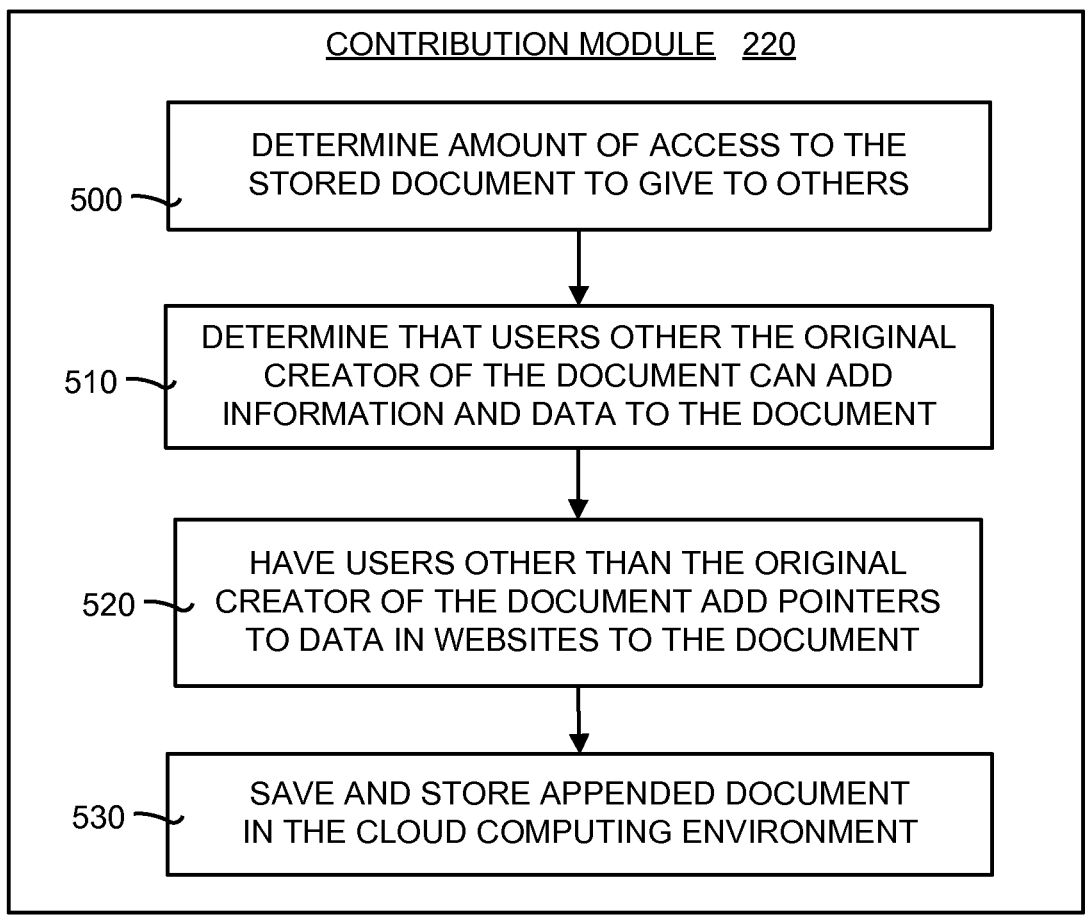
FIG. 5 is a flow diagram illustrating the operational details of embodiments of the contribution module shown in FIG. 2.

The contribution module 220 facilitates the contribution of addition data or amending of the current data in the document from other users. FIG. 5 is a flow diagram illustrating the operational details of embodiments of the contribution module 220 shown in FIG. 2. The operation of embodiments of the contribution module 220 begins with the user that is the original creator of the document determining the amount of access to give others (box 500). In other words, the original author of the document can determine how much access another user can have to the stored document.

In some embodiments, the original author determines that other users can add information and data to the stored document (box 510). In this case, other users are able to access the document and then add data and information to the document (box 520). The addition of data and information is performed using the embodiments of the anchor and update module 210 by adding pointers to the document. As explained above, these pointers point to the data stored at a website (or other information source). Once again, the pointers to the data are stored in the document, not the actual data. Once a user is finished appending the document, then the appended document is saved and stored in the cloud computing environment 110 (box 530).

III.C. Validation Module

Figure 6:
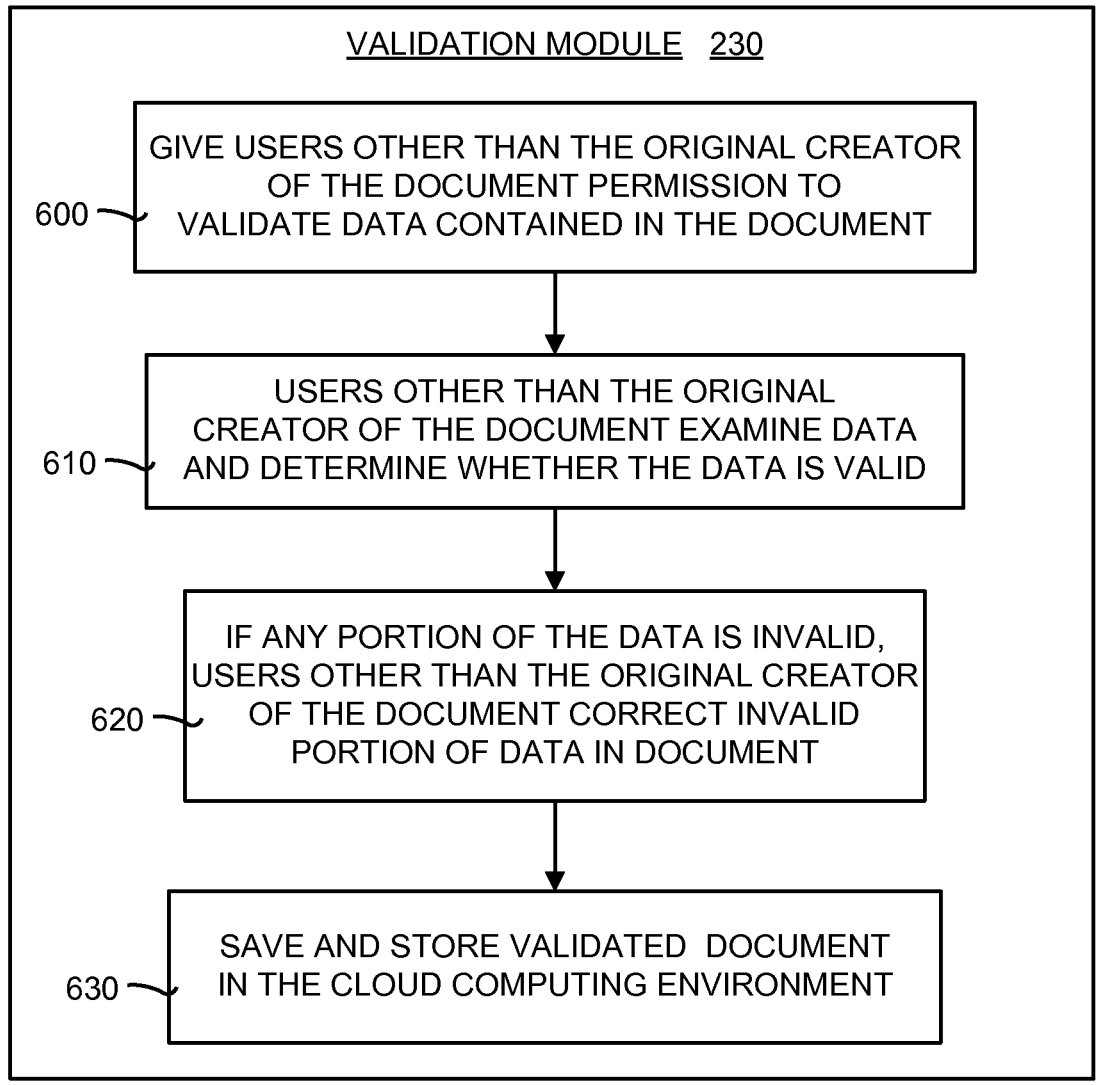
FIG. 6 is a flow diagram illustrating the operational details of embodiments of the validation module shown in FIG. 2.

The validation module 230 allows other users to validate the data contained in the document. Through crowd reputation, the data is validated and verified. FIG. 6 is a flow diagram illustrating the operational details of embodiments of the validation module 230 shown in FIG. 2. The operation of embodiments of the validation module 230 begins with the user that is the original author of the document giving permission to other users to validate data contained in the stored document (box 600).

Next, the other users access the stored document and examine the data (box 610). The other users determine whether the information and data contained in the accessed document is valid. This validation can occur both because of the user's personal knowledge (the user, for example, may be an expert in the field) or based on another's knowledge that the user can cite. If any portion or all of the data is invalid, then the user can correct the incorrect portion of the data (box 620). The validated document then is saved and stored in the cloud computing environment 110 (box 630).

III.D. Expert Ranking Module

Figure 7:
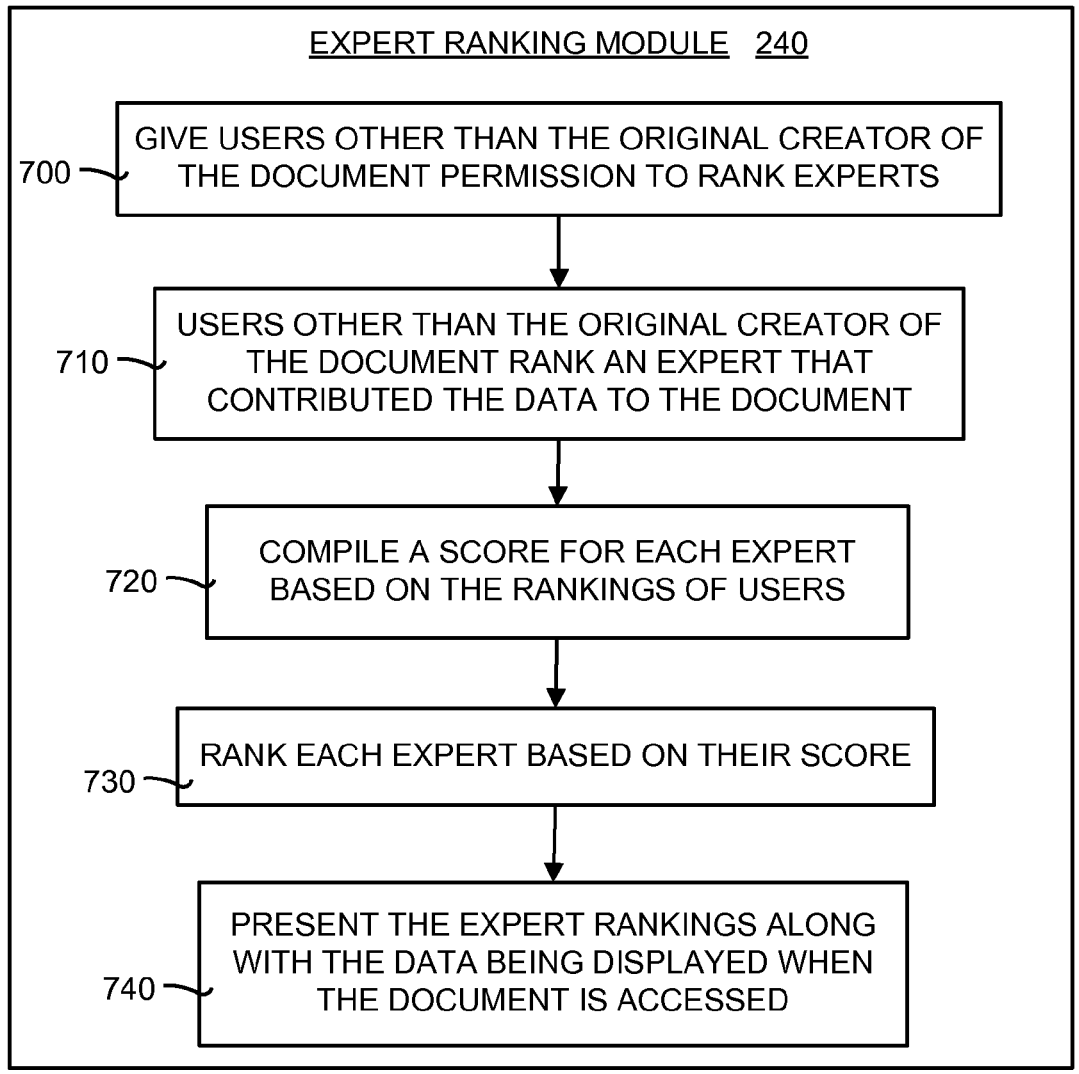
FIG. 7 is a flow diagram illustrating the operational details of embodiments of the expert ranking module shown in FIG. 2.

The expert ranking module 240 allows other users to rank the contributors of data to the stored document. Once again, through crowd reputation the accuracy of the data contained in the document can be assessed based on the reputation of the expert providing the data. FIG. 7 is a flow diagram illustrating the operational details of embodiments of the expert ranking module 240 shown in FIG. 2. The operation of embodiments of the expert ranking module 240 begins with the user that is the original author of the document giving permission to other users to rank expert that have contributed to the data contained in the stored document (box 700).

Next, users other that the original author of the document access the stored document and rank one or more of the experts that contributed to data in the document (box 710). Based on the input of users, a score is compiled for each expert that has contributed to the document (box 720). Each expert then is ranked based on their corresponding score (box 730). This expert ranking is presented to a user whenever the user accesses the stored document (box 740). In other words, the ranking of the expert that supplied the data is displayed alongside the data whenever someone accesses the stored document.

IV. Exemplary Operating Environment

Embodiments of the crowdsourcing data structuring system 100 and method are designed to operate in a computing environment. The following discussion is intended to provide a brief, general description of a suitable computing environment in which embodiments of the crowdsourcing data structuring system 100 and method may be implemented.

Figure 8:
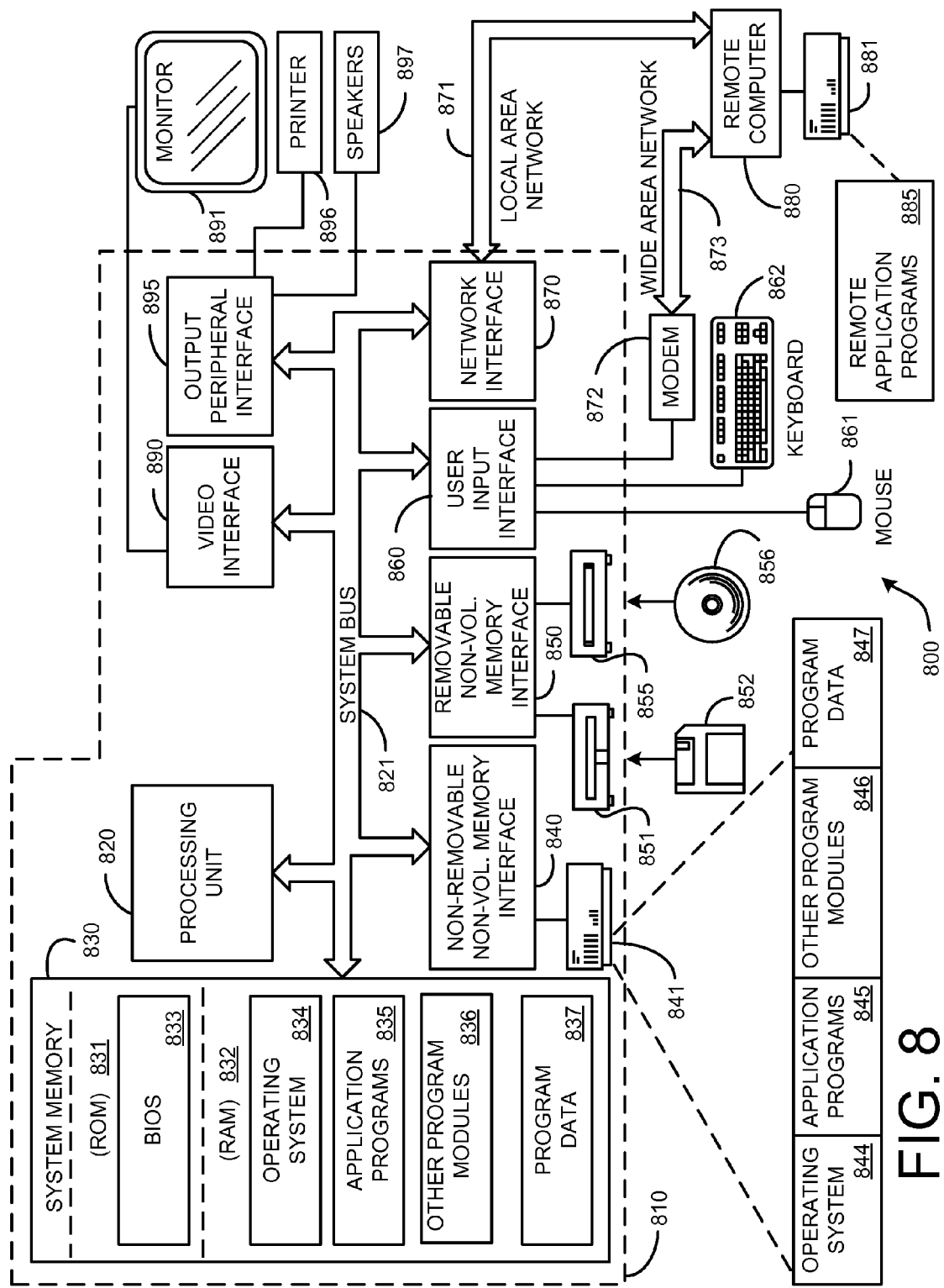
FIG. 8 illustrates an example of a suitable computing system environment in which embodiments of the crowdsourcing data structuring system and method shown in FIGS. 1-7 may be implemented.

FIG. 8 illustrates an example of a suitable computing system environment in which embodiments of the crowdsourcing data structuring system 100 and method shown in FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment.

Embodiments of the crowdsourcing data structuring system 100 and method are operational with numerous other general purpose or special purpose computing system environments or configurations. Examples of well known computing systems, environments, and/or configurations that may be suitable for use with embodiments of the crowdsourcing data structuring system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the crowdsourcing data structuring system 100 and method may be described in the general context of computer-executable instructions, such as program modules, being executed by a computer. Generally, program modules include routines, programs, objects, components, data structures, etc., that perform particular tasks or implement particular abstract data types. Embodiments of the crowdsourcing data structuring system 100 and method may also be practiced in distributed computing environments where tasks are performed by remote processing devices that are linked through a communications network. In a distributed computing environment, program modules may be located in both local and remote computer storage media including memory storage devices. Still further, the aforementioned instructions could be implemented, in part or in whole, as hardware logic circuits, which may or may not include a processor. With reference to FIG. 8, an exemplary system for embodiments of the crowdsourcing data structuring system 100 and method includes a general-purpose computing device in the form of a computer 810.

Components of the computer 810 may include, but are not limited to, a processing unit 820 (such as a central processing unit, CPU), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer readable media. Computer readable media can be any available media that can be accessed by the computer 810 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 810. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within the computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information (or data) into the computer 810 through input devices such as a keyboard 862, pointing device 861, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 820 through a user input interface 860 that is coupled to the system bus 821, but may be connected by other interface and bus structures, such as, for example, a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method implemented by at least one computing device of a cloud computing environment, the method comprising:

receiving multiple authoring inputs from a document creation client device identifying multiple portions of multiple websites, the multiple authoring inputs including a first authoring input identifying a first author-identified portion of a first website that contains first unstructured data and a second authoring input identifying a second author-identified portion of a second website that contains second unstructured data;

obtaining a first pointer that links to the first author-identified portion of the first website;

obtaining a second pointer that links to the second author-identified portion of the second website;

storing the first pointer to the first author-identified portion of the first website and the second pointer to the second author-identified portion of the second website in a document in the cloud computing environment;

receiving validation inputs from a validating client device indicating that the document is a validated document, wherein the validation inputs include a correction to part of the document and the validated document includes the correction;

storing the validated document in the cloud computing environment;

detecting when the first website and the second website are updated;

automatically obtaining updated first unstructured data from the first author-identified portion of the first website via the first pointer stored in the validated document and automatically obtaining updated second unstructured data from the second author-identified portion of the second website via the second pointer stored in the validated document; and providing the updated first unstructured data and the updated second unstructured data to an accessing client device in response to a request by the accessing client device to access the validated document.

2. The method of claim 1, wherein the first authoring input highlights the first author-identified portion of the first website and the second authoring input highlights the second author-identified portion of the second website.

3. The method of claim 1, wherein the validated document does not include the first unstructured data, does not include the second unstructured data, does not include the updated first unstructured data, and does not include the updated second unstructured data.

4. The method of claim 3, wherein the first website contains other first portions having other first unstructured data that was not identified by the first authoring input and other second portions having other second unstructured data that was not identified by the second authoring input.

5. The method of claim 1, further comprising:
receiving organizing inputs from the document creation client to organize the first pointer and the second pointer in the document; and
configuring the validated document to display the updated first unstructured data and the updated second unstructured data in an arrangement based on the organizing inputs received from the document creation client.

6. The method of claim 5, further comprising causing the updated first unstructured data and the updated second unstructured data to be displayed in the arrangement when the validated document is accessed by the accessing client device.

7. The method of claim 1, further comprising:
receiving contributions to the document from other client devices, the contributions identifying other portions of other websites having other unstructured data; and
updating the document to include other pointers to the other unstructured data of the other portions of the other websites.

8. The method of claim 1, further comprising:
receiving ranking inputs from the other client devices to rank an author of the document and other contributors to the validated document;
compiling scores for the author and the other contributors to the validated document based on the ranking inputs;
ranking the author and the other contributors based on the compiled scores; and
displaying the ranking of the author and the other contributors with the updated first unstructured data and the updated second unstructured data when the validated document is accessed by the other client devices.

9. A cloud computing system comprising:
a processor; and
volatile or nonvolatile computer storage storing computer readable instructions which, when executed by the processor, cause the processor to:
receive, from an author of a document, authoring inputs identifying specific portions of multiple different websites, wherein the specific portions of the multiple different websites comprise corresponding unstructured data hosted by the multiple different websites;
store, in the document, pointers that identify the specific portions of the multiple different websites identified by the authoring inputs;
receive validation inputs from a validating user indicating that the document is a validated document, wherein the validation inputs include a correction to part of the document and the validated document includes the correction;
store the validated document on the cloud computing system;
detect that the multiple different websites are updated to include updated unstructured data in the specific portions identified by the authoring inputs; and
when the validated document is accessed by a user other than the author of the validated document, use the pointers stored in the document to automatically obtain the updated unstructured data from the multiple different websites and provide the updated unstructured data to the user other than the author.

10. The computing system of claim 9, wherein the computer readable instructions further cause the processor to:
detect that the multiple different websites have been updated responsive to the validated document being accessed by the user.

11. The computing system of claim 9, wherein the authoring inputs received from the author highlight the specific portions of the multiple different websites.

12. The computing system of claim 11, wherein the computer readable instructions further cause the processor to:
when the validated document is accessed by the user other than the author of the document, obtain the updated unstructured data from the specific portions identified by the authoring inputs and not other unstructured data that is also hosted by the multiple different websites.

13. The computing system of claim 9, wherein the computer readable instructions further cause the processor to:
receive organizing inputs from the author to organize the pointers in the document; and
configure the validated document to display the updated unstructured data in an arrangement based on the organizing inputs received from the author.

14. The computing system of claim 13, wherein the computer readable instructions further cause the processor to:
when the document is accessed by the user other than the author of the document, display the updated unstructured data to the user in the arrangement.

15. The computing system of claim 9, wherein the computer readable instructions further cause the processor to:
receive contributions to the document from contributors other than the author of the document, the contributions identifying additional specific portions of additional websites having additional unstructured data hosted by the additional websites;
update the document to include additional pointers to the additional specific portions of the additional websites; and
when the validated document is accessed by the user other than the author of the document, use the additional pointers to obtain the additional unstructured data hosted by the additional websites and provide the additional unstructured data to the user.

16. The computing system of claim 15, wherein the computer readable instructions further cause the processor to:
receive ranking inputs from individual users other than the author to rank the author and the contributors;
compile scores for the author and the contributors to the document based on the ranking inputs; and
rank the author and the contributors based on the compiled scores.

17. A method implemented by at least one computing device, the method comprising:
- receiving multiple different authoring inputs from an author of a document, the multiple different authoring inputs identifying author-specified portions of multiple different websites having unstructured data, the multiple different websites including a first website having a first author-specified portion with first unstructured data and a second website having a second author-specified portion with second unstructured data;
- obtaining a first pointer that links to the first author-specified portion of the first website;
- obtaining a second pointer that links to the second author-specified portion of the second website;
- storing the first pointer to the first author-specified portion of the first website and the second pointer to the second author-specified portion of the second website in a document in a cloud computing environment;
- receiving validation inputs from a validating user indicating that the document is a validated document, wherein the validation inputs include a correction to part of the document and the validated document includes the correction;
- storing the validated document in the cloud computing environment;
- detecting that the first unstructured data of the first author-specified portion of the first website is updated by the first website with updated first unstructured data and obtaining the updated first unstructured data from the first website; and
- detecting that the second unstructured data of the second author-specified portion of the second website is updated by the second website with updated second unstructured data and obtaining the updated second unstructured data from the second website; and
- when a user other than the author of the validated document accesses the validated document, automatically providing the updated first unstructured data and the updated second unstructured data to the user other than the author of the validated document.

18. The method of claim 17, wherein the obtaining the updated first unstructured data from the first website and the obtaining the updated second unstructured data from the second website are performed responsive to the user other than the author accessing the validated document.

19. The method of claim 17, further comprising:
- obtaining another first pointer that links to another first author-specified portion of the first website having other first unstructured data;
- storing the another first pointer in the document; and
- when the user other than the author accesses the validated document, providing the other first unstructured data to the user with the updated first unstructured data and the updated second unstructured data.

20. The method of claim 19, wherein the other first unstructured data is not updated between a first time when the another first pointer is stored in the document and a second time when the other first unstructured data is provided to the user.

* * * * *